United States Patent [19]
Deli et al.

[11] 3,879,476
[45] Apr. 22, 1975

[54] HERBICIDAL CHLORINATED BENZYL ALCOHOLS

[75] Inventors: Joseph Deli; Jerome M. Lavanish, both of Akron, Ohio

[73] Assignee: PPG Industries, Inc., Pittsburgh, Pa.

[22] Filed: June 20, 1972

[21] Appl. No.: 264,684

[52] U.S. Cl.............................. 260/618 D; 71/122
[51] Int. Cl............................................ C07c 35/00
[58] Field of Search....................... 260/618, 618 D

[56] References Cited
UNITED STATES PATENTS
3,375,096   3/1968   Girard.................................. 71/122

OTHER PUBLICATIONS
Barontsevich et al., "Chemical Abstracts," Vol. 66, par. 115200v (1967).
Virtanen et al., "Chem. Abstracts," Vol. 70, Abst. No. 56893f (1969).
Khruslova et al., "Chem. Abstracts," Vol. 71, Abst. No. 111738g (1969).
Fuson et al., "J. A. C. S.," Vol. 64, pp. 30–33 (1942).

*Primary Examiner*—Donald G. Daus
*Assistant Examiner*—David B. Springer
*Attorney, Agent, or Firm*—Mark Levin; George D. Morris

[57] ABSTRACT

Chlorinated benzyl alcohols are disclosed which may be applied to the soil to preclude the establishment of weeds in the soil. These compounds are particularly effective in preventing the establishment of crabgrass.

1 Claim, No Drawings

HERBICIDAL CHLORINATED BENZYL ALCOHOLS

CROSS REFERENCE TO RELATED APPLICATIONS

This application which is assigned to PPG INDUSTRIES, INC. is related to PPG INDUSTRIES, INC. co-pending application, 'USE OF HERBICIDAL BENZYL ALCOHOLS', Ser. No. 382,623, filed July 25, 1973 which describes methods of using Herbicidal Benzyl Alcohols for control of weeds particularly crabgrass, and to PPG INDUSTRIES, INC. co-pending application entitled "HERBICIDAL BENZYL ALCOHOLS", Ser. No. 382,630, Filed July 25, 1973 which describes 1-ethyl-triisopropyl benzyl alcohols.

In accordance with this invention, there are provided chlorinated benzyl alcohols which are effective in controlling weeds. One or more chlorinated benzyl alcohols may be applied to the soil in an amount effective to preclude the establishment of weeds in the soil. Chlorinated benzyl alcohols here contemplated include those represented by the formula:

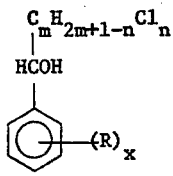

wherein
each R is independently an alkyl containing from 1 to 6 carbon atoms;
$x$ is an integer ranging from 0 to 5; $m$ is an integer ranging from 1 to 4; and $n$ is an integer ranging from 1 to $(2m+1)$.

Although R may contain from 1 to 6 carbon atoms, it usually contains from 1 to 3 carbon atoms. The isopropyl group is preferred. When more than one R group is present, the groups may be the same or different. It is preferred that all R groups be the same.

The value of $x$ may be 0, 1, 2, 3, 4, or 5, but values of 1, 2, or 3, and especially values of 2 or 3, are preferred. A value of 3 is particularly favored. The various R groups may be located in any of the five available places on the ring, but the 2', 4'-positions, the 2', 4', 5'-positions, the 2', 4', 6'-positions, and the 2', 3', 5', 6'-positions are preferred. Location in the 2', 4', 6'-positions is especially preferred.

The value of $m$ in the chlorinated alkyl group, $-C_mH_{2m+1-n}Cl_n$, may be 1, 2, 3 or 4. Most often $m$ will be 1, 2 or 3; a value of 1 is preferred. The value of $n$ may range from 1 to $(2m+1)$. Usually the value of $n$ is less than $(2m+1)$. The preferred chlorinated alkyl groups are chloromethyl, dichloromethyl, and trichloromethyl.

The above classes and subclasses of compounds are especially effective against annual grasses, particularly small-seeded annual grasses such as crabgrass. Consequently, crabgrass or other annual grasses may be controlled by applying to the soil an amount of one or more of the chlorinated benzyl alcohols to preclude the establishment of crabgrass or other annual grasses in the soil.

Compounds which exemplify the chlorinated benzyl alcohols of the present invention are:

1-chloromethyl-2', 3'-dimethylbenzyl alcohol
1-chloromethyl-2'-methyl-3'-ethylbenzyl alcohol
1-dichloromethyl-2'-methyl-3'-isopropylbenzyl alcohol
1-dichloromethyl-3'-methyl-2'-ethylbenzyl alcohol
1-chloromethyl-2'-ethyl-3'-amylbenzyl alcohol
1-dichloromethyl-2'-ethyl-3'-(3-methylbutyl)benzyl alcohol 1-trichloromethyl-2', 4'-dimethylbenzyl alcohol 1-trichloromethyl-2'-methyl-4'-ethylbenzyl alcohol 1-dichloromethyl-2'-ethyl-4'-propylbenzyl alcohol 1-chloromethyl-2'-ethyl-4'-(3-methylpentyl)benzyl alcohol 1-chloromethyl-4'-methyl-2'-isopropylbenzyl alcohol 1-dichloromethyl-2'-propyl-4'-ethylbenzyl alcohol
1-trichloromethyl-2', 5'-dimethylbenzyl alcohol
1-trichloromethyl-2'-methyl-5'-propylbenzyl alcohol 1-dichloromethyl-2'-methyl-5'-isobutylbenzyl alcohol
1-chloromethyl-2'-ethyl-5'-amylbenzyl alcohol
1-choromethyl-2'-sec-butyl-5'-isopropylbenzyl alcohol
1-chloromethyl-2', 6'-dimethylbenzyl alcohol
1-dichloromethyl-2'-methyl-6'-ethylbenzyl alcohol
1-trichloromethyl-2'-methyl-6'-isopropylbenzyl alcohol
1-trichloromethyl-2', 6'-diisopropylbenzyl alcohol
1-trichloromethyl-2'-ethyl-6'-isobutylbenzyl alcohol
1-chloromethyl-2'-ethyl-6'-(2-methylbutyl)benzyl alcohol
1-dichloromethyl-3', 4'-dimethylbenzyl alcohol
1-dichloromethyl-3'-methyl-4'-ethylbenzyl alcohol
1-trichloromethyl-3'-methyl-4'-propylbenzyl alcohol
1-chloromethyl-4'-methyl-3'-ethylbenzyl alcohol
1-chloromethyl-3'-ethyl-4'-amylbenzyl alcohol
1-dichloromethyl-2'-ethyl-4'-hexylbenzyl alcohol
1-chloromethyl-3', 5'-dimethylbenzyl alcohol
1-dichloromethyl-3'-methyl-5'-ethylbenzyl alcohol
1-chloromethyl-3'-methyl-5'-isopropylbenzyl alcohol
1-trichloromethyl-3'-methyl-5'-tert-butylbenzyl alcohol
1-dichloromethyl-3', 5'-diisopropylbenzyl alcohol
1-dichloromethyl-2', 3', 4'-trimethylbenzyl alcohol
1-chloromethyl-2', 3'-dimethyl-4'-ethylbenzyl alcohol
1-chloromethyl-2', 6'-dimethyl-4'-tert-butylbenzyl alcohol
1-trichloromethyl-4'-methyl-2', 3'-diethylbenzyl alcohol
1-chloromethyl-2', 3', 5'-trimethylbenzyl alcohol
1-dichloromethyl-2', 3'-dimethyl-5'-isopropylbenzyl alcohol
1-trichloromethyl-2', 3'-dimethyl-5'-butylbenzyl alcohol
1-chloromethyl-2', 6'-dimethyl-4'-(2,3-dimethylbutyl)benzyl alcohol
1-chloromethyl-3'-methyl-2'-ethyl-5'-isobutylbenzyl alcohol
1-trichloromethyl-2', 3', 6'-triisopropylbenzyl alcohol
1-dichloromethyl-2'-ethyl-3', 6'-diisopropylbenzyl alcohol
1-chloromethyl-6'-methyl-2'-isopropyl-3'-ethylbenzyl alcohol
1-dichloromethyl-2', 4', 5'-trimethylbenzyl alcohol
1-dichloromethyl-2', 4', 5'-triisopropylbenzyl alcohol 1-dichloromethyl-2'-methyl-4', 5'-diethylbenzyl alcohol
1-dichloromethyl-2', 4'-dimethyl-5'-ethylbenzyl alcohol
1-chloromethyl-2', 4', 6'-trimethylbenzyl alcohol
1-trichloromethyl-2', 4', 6'-triethylbenzyl alcohol
1-trichloromethyl-2', 4', 6'-triisopropylbenzyl alcohol
1-dichloromethyl-2'-ethyl-4', 6'-diisopropylbenzyl alcohol
1-trichloromethyl-2'-isopropyl-4'-isobutyl-6'-ethylbenzyl alcohol
1-chloromethyl-2', 4'-dipropyl-6'-isopropylbenzyl alcohol
1-chloromethyl-3', 4', 5'-trimethylbenzyl alcohol
1-trichloromethyl-2', 3', 4', 5'-tetramethylbenzyl alcohol
1-dichloromethyl-2', 3', 4', 5'-tetraisopropylbenzyl alcohol
1-dichloromethyl-2', 3'-dimethyl-4', 5'-diethylbenzyl alcohol
1-dichloromethyl-2', 4'-dimethyl-3'-ethyl-5'-isopropylbenzyl alcohol
1-chloromethyl-2', 3', 4', 6'-tetramethylbenzyl alcohol
1-trichloromethyl-2', 3', 4', 6'-tetrapropylbenzyl alcohol
1-dichloromethyl-2', 3', 4', 6'-tetraisopropylbenzyl alcohol
1-dichloromethyl-2', 3', 5', 6'-tetraisopropylbenzyl alcohol
1-(1-chloroethyl)-2', 3'-dimethylbenzyl alcohol
1-(2,2-dichloroethyl)-3'-ethyl-2'-methylbenzyl alcohol
1-(1,2,2-trichloroethyl)-2'-ethyl-3'-isopropylbenzyl alcohol
1-pentachloroethyl-2'-propyl-3'-methylbenzyl alcohol
1-(2-chloroethyl)-2'-methyl-3'-amylbenzyl alcohol
1-(1,1,2,2-tetrachloroethyl)-2', 4'-dimethylbenzyl alcohol
1-(1,1,2,2-tetrachloroethyl)-2', 4'-diisopropylbenzyl alcohol
1-(1,2-dichloroethyl)-2'-ethyl-4'-methylbenzyl alcohol
1-(1,2,2-trichloroethyl)-2'-diethyl-4'-tert-butylbenzyl alcohol
1-(1,2,2,2-tetrachloroethyl)-2'-propyl-4'-(1-methylbutyl)benzyl alcohol
1-(1-chloroethyl)-2', 5'-dimethylbenzyl alcohol
1-(1,1,2-trichloroethyl)-2', 5'-diethylbenzyl alcohol
1-(1,1,2-trichloroethyl)-2'-methyl-5'-isopropylbenzyl alcohol
1-(1,1,2,2-tetrachloroethyl)-2'-ethyl-5'-(2,2-dimethylpropyl)benzyl alcohol
1-(1-chloroethyl)-2', 6'-dimethylbenzyl alcohol
1-(2-chloroethyl)-2', 6'-diethylbenzyl alcohol
1-pentachloroethyl-2', 6'-diisopropylbenzyl alcohol
1-(2,2,2-trichloroethyl)-2', 6'-dibutylbenzyl alcohol
1-(1-chloroethyl)-6'-ethyl-2'-methylbenzyl alcohol
1-(2-chloroethyl)-2'-methyl-6'-propylbenzyl alcohol
1-(2-chloroethyl)-3',4'-dimethylbenzyl alcohol
1-(2,2,2-trichloroethyl)-4'-ethyl-3'-methylbenzyl alcohol
1-(1,2-dichloroethyl)-3'-ethyl-4'-methylbenzyl alcohol
1-(1,1-dichloroethyl)-3',5'-dimethylbenzyl alcohol
1-(1,2-dichloroethyl)-3',5'-diisopropylbenzyl alcohol
1-(2-chloroethyl)-3',5'-diamylbenzyl alcohol
1-(2-chloroethyl)-3'-ethyl-5'-tert-butylbenzyl alcohol
1-pentachloroethyl-2',3',4'-trimethylbenzyl alcohol
1-(1,2-dichloroethyl)-4'-ethyl-2',3'-dimethylbenzyl alcohol
1-(2-chloroethyl)-2',3',5'-trimethylbenzyl alcohol
1-(2-chloroethyl)-2',3',5'-triisopropylbenzyl alcohol
1-(1,1,2,2-tetrachloroethyl)-5'-ethyl-2',3'-dimethylbenzyl alcohol
1-(1-chloroethyl)-2'-ethyl-3',5'-dibutylbenzyl alcohol
1-(1,1,2-trichloroethyl)-2',5'-diethyl-3'-methylbenzyl alcohol
1-(1,2,2,2-tetrachloroethyl)-2',5'-dimethyl-3'-propylbenzyl alcohol
1-(1,2,2,2-tetrachloroethyl)-2',3',6'-trimethylbenzyl alcohol
1-(2,2,2-trichloroethyl)-2',3',6'-triethylbenzyl alcohol
1-pentachloroethyl-2',6'-diethyl-4'-hexylbenzyl alcohol
1-(1,1,2,2-tetrachloroethyl)-2',3',6'-triisopropylbenzyl alcohol
1-(1,1,2,2-tetrachloroethyl)-2',6'-diethyl-3'-methylbenzyl alcohol
1-(1,1,2,2-tetrachloroethyl)-2',4',5'-trimethylbenzyl alcohol
1-(1-chloroethyl)-2',4',5'-triethylbenzyl alcohol
1-(1,2,2-trichloroethyl)-2',4',5'-tripropylbenzyl alcohol
1-(2-chloroethyl)-2',4',5'-triisopropylbenzyl alcohol
1-(2,2-dichloroethyl)-2',4',5'-tributylbenzyl alcohol
1-pentachloroethyl-2',4',5'-triisobutylbenzyl alcohol
1-(1,2-dichloroethyl)-2',4'-dimethyl-5'-amylbenzyl alcohol
1-(2-chloroethyl)-2'-ethyl-4',5'-dimethylbenzyl alcohol
1-(2-chloroethyl)-4'-ethyl-2',5'-dimethylbenzyl alcohol
1-(1,1,2-trichloroethyl)-2',5'-dimethyl-4'-propylbenzyl alcohol
1-(1,2-dichloroethyl)-2',4',6'-trimethylbenzyl alcohol
1-(1,1,2,2-tetrachloroethyl)-2',4',6'-triethylbenzyl alcohol
1-(1-chloroethyl)-2',4',6'-tripropylbenzyl alcohol
1-pentachloroethyl-2',4',6'-triisopropylbenzyl alcohol
1-(1,2,2,2-tetrachloroethyl)-2',4',6'-tributylbenzyl alcohol
1-(1-chloroethyl)-2',4',6'-triisobutylbenzyl alcohol
1-(2,2,2-trichloroethyl)-2',4',6'-tri-sec-butylbenzyl alcohol
1-(2-chloroethyl)-2',4',6'-tri-tert-butylbenzyl alcohol
1-(2-chloroethyl)-2',4',6'-triamylbenzyl alcohol
1-(1,2,2,2-tetrachloroethyl)-2',4'-dipropyl-6'-methylbenzyl alcohol
1-pentachloroethyl-6'-ethyl-2',4'-diisopropylbenzyl alcohol
1-pentachloroethyl-6'-ethyl-2',4'-dimethylbenzyl alcohol
1-(1,2-dichloroethyl)-2',6'-dimethyl-4'-isopropylbenzyl alcohol 1-(2,2,2-trichloroethyl)-2',6'-dimethyl-4'-sec-butylbenzyl alcohol
1-(1,2-dichloroethyl)-2',6'-diethyl-4'-propylbenzyl alcohol
1-(1,1-dichloroethyl)-3',4',5'-trimethylbenzyl alcohol
1-(1,1,2,2-tetrachloroethyl)-3',4',5'-triethylbenzyl alcohol
1-(1-chloroethyl)-2',3',4',5'-tetramethylbenzyl alcohol
1-(2-chloroethyl)-2',3',4',5'-tetraisopropylbenzyl alcohol
1-(1,1,2-trichloroethyl)-2',3',4',5'-tetrapropylbenzyl alcohol
1-(1,1,2-trichloroethyl)-3',4'-diethyl-2',5'-dimethylbenzyl alcohol
1-(1,1-dichloroethyl)-2',3',4',6'-tetramethylbenzyl alcohol
1-(1,1-dichloroethyl)-2',3',4',6'-tetraethylbenzyl alcohol
1-(1,1,2,2-tetrachloroethyl)-2',3',4',6'-tetrapropylbenzyl alcohol
1-(2,2-dichloroethyl)-2',3',4',6'-tetraisopropylbenzyl alcohol
1-pentachloroethyl-2',3',4',6'-tetrabutylbenzyl alcohol
1-(1-chloroethyl)-2',3',4',6'-tetraamylbenzyl alcohol
1-(1,2-dichloroethyl)-3',4'-diethyl-2',6'-dimethylbenzyl alcohol
1-(2,2,2-trichloroethyl)-2',3',4'-trimethyl-6'-isopropylbenzyl alcohol
1'-(1,1,2-trichloroethyl)-2',3',5',6'-tetramethylbenzyl alcohol
1-(2,2-dichloroethyl)-2',3',5',6'-tetraethylbenzyl alcohol
1-(1-chloroethyl)-2',3',5',6'-tetrapropylbenzyl alcohol
1-(2-chloroethyl)-2',3',5',6'-tetraisopropylbenzyl alcohol
1-(2,2,2-trichloroethyl)-2',3',5',6'-tetrabutylbenzyl alcohol
1-(1-chloroethyl)-5'-ethyl-2',3',6'-trimethylbenzyl alcohol
1-heptachloropropyl-2',3'-dimethylbenzyl alcohol
1-(1,2,3,3-tetrachloropropyl)-2',4'-diisopropylbenzyl alcohol
1-(2,2,3,3,3-pentachloropropyl)-2'-methyl-5'-ethylbenzyl alcohol
1-(2-chloropropyl)-2',6'-diisopropylbenzyl alcohol
1-(2,3,3,3-tetrachloropropyl)-2',4',6'-trimethylbenzyl alcohol
1-(2,3-dichloropropyl)-2'-ethyl-4',5'-dimethylbenzyl alcohol
1-(3-chloropropyl)-2',4',6'-triisopropylbenzyl alcohol
1-(1-methyl-2,2-dichloroethyl)-2',4'-dimethylbenzyl alcohol
1-(1-chloromethyl-2-chloroethyl)-2',4'-diisopropylbenzyl alcohol
1-(1-methyl-2,2-dichloroethyl)-2',4'-dimethylbenzyl alcohol
1-(1-trichloromethyl-2-chloroethyl)-3',4'-dimethylbenzyl alcohol
1-(1-dichloromethylethyl)-2',4'-diethylbenzyl alcohol
1-(1-trichloromethyl-2,2,2-trichloroethyl)-2',3',5'-trimethylbenzyl alcohol
1-(1-methyl-1-chloroethyl)-2',4',6'-trimethylbenzyl alcohol
1-(1-chloromethyl-1,2-dichloroethyl)-2',4',6'-triethylbenzyl alcohol
1-(1-trichloromethyl-1,2,2,2-tetrachloroethyl)-2',4',6'-triisopropylbenzyl alcohol
1-(1-methyl-1-chloroethyl)-2',3'-dimethyl-5'-propylbenzyl alcohol
1-(1-chloromethylethyl)-2',3',5',6'-tetramethylbenzyl alcohol
1-(1-chloromethylethyl)-2',3',5',6'-tetraisopropylbenzyl alcohol
1-(3-chlorobutyl)-2',4'-dimethylbenzyl alcohol
1-(2,3,3,4-tetrachlorobutyl)-2',4'-diisopropylbenzyl alcohol
1-(2,3-dichlorobutyl)-2',4',5'-trimethylbenzyl alcohol
1-(1,2,4-trichlorobutyl)-2',4',6'-trimethylbenzyl alcohol
1-(3-chlorobutyl)-2',4',6'-triisopropylbenzyl alcohol
1-perchlorobutyl-2',4',5'-triisopropylbenzyl alcohol
1-(2,2,3,3,4-pentachlorobutyl)-2',3',5',6'-tetramethylbenzyl alcohol
1-(4-chlorobutyl)-2',3',5',6'-tetrapropylbenzyl alcohol
1-(2-chlorobutyl)-2',3',5',6'-tetraispropylbenzyl alcohol
1-(1-chloromethylpropyl)-2',4'-dimethylbenzyl alcohol
1-(1-methyl-3-chloropropyl)-3'-sec-butyl-5'-methylbenzyl alcohol
1-(1-methyl-1,2-dichloropropyl-2',4'-diisopropylbenzyl alcohol
1-(1-dichloromethyl-3,3-dichloropropyl)-2',4',6'-triisopropylbenzyl alcohol
1-(1-methyl-3-chloropropyl)-2',3',5',6'-tetraisopropylbenzyl alcohol
1-(2-methyl-3-chloropropyl)-2',4'-dimethylbenzyl alcohol
1-(2-dichloromethylpropyl)-2',5'-dimethylbenzyl alcohol
1-(2-trichloromethyl-3,3,3-trichloropropyl)-2'-methyl-5'-hexylbenzyl alcohol
1-(1-chloro-2-methylpropyl)-2',6'-dimethyl-4'-sec-butylbenzyl alcohol
1-(2-chloromethylpropyl)-2',4',6'-trimethylbenzyl alcohol
1-(2-chloromethylpropyl)-2',4',6'-triisopropylbenzyl alcohol
1-(2-chloromethyl-3-chloropropyl)-2',5'-dimethyl-3'-hexylbenzyl alcohol
1-(2-dichloromethylpropyl)-2',3',5',6'-tetramethylbenzyl alcohol
1-(2-chloromethyl-3,3,3-trichloropropyl)-2',3',5',6'-tetraisopropylbenzyl alcohol
1-(1,1-dimethyl-2-chloroethyl)-2',4'-dimethylbenzyl alcohol
1-(1,1-dimethyl-2-chloroethyl)-2',4'-diisopropylbenzyl alcohol
1-(1-methyl-1-chloromethyl-2-chloroethyl)-2',4',6'-trimethylbenzyl alcohol
1-(1-methyl-1-chloromethyl-2-chloroethyl)-2',4',6'-triisopropylbenzyl alcohol
1-(1,1-dimethyl-2,2-dichloroethyl)-2',3',5',6'-tetramethylbenzyl alcohol 1-(1,1-dimethyl-2-chloroethyl)-2',3',5',6'-tetraethylbenzyl alcohol 1-(1,1-dimethyl-2-chloroethyl)-2',3',5',6'-tetraisopropylbenzyl alcohol The chlorinated benzyl alcohols may be prepared by the reaction of the appropriate aryl Grignard reagent with the appropriate chlorinated aldehyde. The reaction may conveniently be conducted in an inert solvent.

The chlorinated benzyl alcohols may also be prepared by the reduction of the appropriate chloroalkyl aryl ketones. One particularly useful reducing agent for this purpose may be formed in situ from sodium borohydride and boron trifluoride etherate.

Most of the chloroalkyl aryl ketones may be prepared by any of the methods well known in chemistry. One of these is the reaction, in the presence of aluminum chloride, of a substituted benzene with a chlorinated acyl chloride.

Illustrative preparations of the chlorinated benzyl alcohols are shown in Examples I and II:

EXAMPLE I

2-Chloro-2',4',6'-triisopropylacetophenone

A 300-ml, three-necked flask was fitted with a mechanical stirrer, addition funnel, and reflux condenser with drying tube. The flask was charged with 14.7 g (0.11 mole) of aluminum chloride in 50 ml of carbon tetrachloride and cooled in an ice bath. Chloroacetyl chloride in the amount of 12.4 g (0.11 mole) in 25 ml of carbon tetrachloride was then added. The addition funnel was charged with 20.4 g (0.10 mole) of 1,3,5-triisopropylbenzene in 30 ml of carbon tetrachloride. This solution was added to the flask with stirring over a period of about 1 hour. The resulting orange slurry was stirred at ice bath temperature for about 2½ hours and then poured into 100 g of crushed ice. After the ice had melted, the nearly colorless organic layer was separated and washed with 100 ml of water and 100 ml of 5% aqueous sodium bicarbonate, and then dried over anhydrous magnesium sulfate. Removal of the solvent in a rotary film evaporator gave 26.2 g of yellow oil which gave crystals when seeded with a crystal of 1-ethyl-2',4',6'-triisopropylbenzyl alcohol. Vapor phase chromatographic analysis showed that the crude 2-chloro-2',4',6'-triisopropylacetophenone product contained about 6 mole percent of 1,3,5-triisopropylbenzene and only trace amounts of other impurities. This material was used without further purification. The 2-chloro-2',4',6'-triisopropylacetophenone may be depicted as having the structural formula:

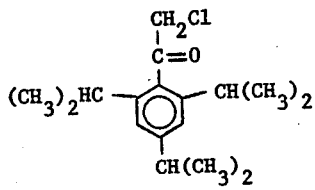

1-Chloromethyl-2',4',6'-triisopropylbenzyl Alcohol

A 250-ml, three-necked flask was fitted with a magnetic stirring bar, thermometer, addition funnel, and reflux condenser with drying tube. The flask was charged with 1.6 g (0.043 mole) of sodium borohydride in 50 ml of diglyme. To this were added 10.0 g (0.036 mole) of the above-prepared impure 2-chloro-2',4',6'-triisopropylacetophenone. The addition was mildly exothermic and there was minor gas evolution. The addition funnel was charged with 7.7 g (0.054 mole) of boron trifluoride etherate in 10 ml of diglyme. Solution in the funnel was slowly added to the reaction mixture in the flask. When about half of the solution has been added, an additional 20 ml of diglyme was added to facilitate stirring. The remainder of the solution in the funnel was then added. These additions were completed in about 3 hours. The addition of solution from the funnel was exothermic and gas was evolved. The mixture was stirred overnight. The reaction slurry was then carefully poured over 100 g of crushed ice and the evolution of gas was observed. After warming to room temperature, this was extracted with two 100-ml portions of normal hexane, and the combined hexane extract was washed with two 100-ml portions of water and then dried over magnesium sulfate. Removal of solvent in a rotary film evaporator gave 8.6 g of very viscous residue which partially crystallized on standing. Recrystallization from 20 ml of normal hexane at −40°C. and filtration while cold gave, after vacuum drying at 70°C., 2.1 g of fluffy white tacky powder having a melting point range of 97°C. − 105°C. The product may be depicted as having the structural formula:

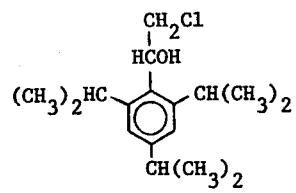

EXAMPLE II

1-Trichloromethyl-2',4',6'-triisopropylbenzyl Alcohol

To an ethereal solution of 2,4,6-triisopropylphenyl magnesium bromide prepared by the method of R. C. Fuson and E. C. Horning, *Journal of the American Chemical Society*, 62, 2962 (1940), is added with stirring a molar equivalent of chloral. The reaction mixture is then quenched with water, the organic layer is separated, dried over magnesium sulfate, and filtered. Removal of the ether under vacuum gives 1-trichloromethyl-2',4',6'-triisopropylbenzyl alcohol. The product may be depicted as having the structural formula:

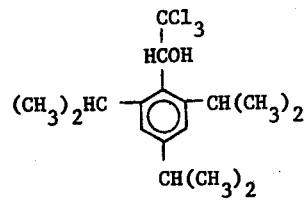

One or more chlorinated benzyl alcohols may be applied to the soil in an amount effective to preclude the establishment of weeds, particularly annual grasses such as crabgrass, in the soil. The establishment precluded is with respect to mature weeds or weeds sufficiently advanced in growth to significantly interfere with the growth of desirable plants; mere germination of weed seeds to produce tender seedlings which are susceptible to attack by the chlorinated benzyl alcohols is not establishment as used herein.

The amount of the chlorinated benzyl alcohol applied to the soil may vary widely. The amount applied usually is in the range of from 0.1 to 100 pounds per acre. Usually the amount is in the range of from 0.1 to 50 pounds per acre or even in the range of from 0.5 to 20 pounds per acre. Application in the range of from 0.5 to 10 pounds per acre is preferred. While these ranges are generally applicable, it is recognized that both the optimum and useful amounts will vary depending upon the crop plant involved, if any, the weeds encountered, the particular compound used, the soil conditions, cultivation practices, and the effect desired. The Examples give an even better indication of the amounts of the chlorinated benzyl alcohols which may advantageously be used when dealing with certain weeds.

The chlorinated benzyl alcohols may be formulated in many ways. Convenient formulations include granular formulations, wettable powders, solutions, and emulsions. These formulations may be prepared in accordance with the general techniques well known to the art. These formulations may be applied directly to the soil or they may be diluted before application.

Generally speaking, formulations contain from about 0.1 to 100 percent by weight of the chlorinated benzyl alcohol. Often formulations contain from about 1 to about 50 percent by weight of the benzyl alcohol. Of course, the precise amount will depend upon such factors as the type of formulation employed, the type of application, and the mode of application.

Suitable wettable powders typically contain from about 1 to about 100 percent by weight of the benzyl alcohol. Ordinarily wettable powders contain from 10 to 85 percent by weight of the benzyl alcohol. The chlorinated benzyl alcohol may be admixed with an inert powder such as silica, chalk, talc, limestone, or clay. Any convenient amount of diluent may be used, from about 15 to about 90 percent being typical. Small amounts of dispersing and/or wetting agents are usually included in the formulations. These usually range from 0.1 to 15 percent by weight of the formulation. Ordinarily amounts ranging from 1 to 12 percent are used. The wettable powder is typically dispersed in water for application.

Solutions of the chlorinated benzyl alcohol may be prepared. Ordinarily, concentrated solutions are prepared which, when diluted with water for application, form emulsions. Solvents suitable for use are numerous and include many well known for their solvency powers. Examples include the xylenes, toluene, methyl alcohol, ethyl alcohol, isopropyl alcohol, the butyl alcohols, water gasoline, kerosene, diethyl ether, methyl ethyl ether, ethylene glycol, propylene glycol, n-amyl acetate, allyl alcohol, cellusolve, methyl acetate, ethyl acetate, acetone, methyl ethyl ketone, methyl isobutyl ketone, benzene methyl naphthalene, ethyl naphthalene, and edible oils such as corn oil, olive oil, cod liver oil, cottonseed oil, safflower oil, soybean oil, and peanut oil.

The formulations of the present invention frequently include small amounts of various surfactants such as wetting agents, emulsifiers, and dispersants. Anionic surfactants are used for wettable powders. Emulsifiable concentrates generally contain blends of ionic and anionic surfactants. Many surfactants are available as commercial products. Well known dispersing agents which are useful in wettable powders include the lignin surfactants (ligno sulfonates) such as those described in U.S. Pat. No. 2,491,832, and the alkaryl sulfonates. The ligno sulfonates of most interest are the metallic, notably the sodium and calcium, sulfonate salts. Molecular weights of these materials normally range from about 1,000 to about 20,000. Another useful class of surfactants comprises the formaldehyde-naphthalene sulfonate condensates typified by those disclosed in U.S. Pat. No. 2,516,095. Other useful dispersing agents are found among the alkali metal derivatives of unsaturated and aromatic hydrocarbons, the alkali metal alcoholates of long chain alcohols, and the anhydrous alkali metal soaps of higher fatty acids. Particularly suitable wetting agents for wettable powders are the taurates typified by sodium N-methyl-N-oleoyl taurate. Sodium alkyl naphthalene sulfonates and the oleic acid ester of sodium isothionate are also especially useful. The condensation products of alkylene oxides with phenols and organic acids, the polyalkylene derivatives of sorbitan esters, complex ether alcohols, and mahogany soaps are examples of useful ionic surfactants. Other surface-active agents of the same or similar physical properties are known to the art and can be employed in the formulations of this invention.

It is often desirable to include in a formulation which is to be mixed with water a small amount, e.g., about one-tenth to about 1 percent by weight, of a suitable anti-foaming agent. Useful anti-foaming agents include the ditertiary acetylenic glycols, such as those marketed under the tradename SURFYNOL by Air Reduction Chemical and Carbide Company, 150 E. 42nd Street, New York, N.Y. 10017. Other compounds known to the art to function as anti-foaming agents may be employed if desired. Such compounds include 2-octonol, sulfonated oils, and silicones. Useful silicones are those of low molecular weight, i.e., the silicone fluids or oils. Typical of these are the methyl and ethyl substituted siloxanes such as the dimethyl siloxanes.

Many of the solvents, solvent systems, and wetting agents are discussed in U.S. Pat. Nos. 2,695,225 and 3,330,642 and Canadian Pat. No. 851,658.

The amount of the chlorinated benzyl alcohol in liquid formulations, including both single-phase solutions and emulsions, is subject to wide variation. The liquid may contain the chlorinated benzyl alcohol in very dilute concentrations although it is ordinarily not so dilute that excessive amounts of solvent must be applied in order to achieve application of a useful amount of the chlorinated benzyl alcohol. The lowest practical concentration for most purposes is the concentration at which the formulation is applied to the soil. The upper limit of concentration is the solubility limit of the chlorinated benzyl alcohol in the solvent or solvent system used. This will, of course, depend upon the identity of the chlorinated benzyl alcohol, the identity of the solvent system, and the highest temperature for which precipitation of solids is acceptable. It is ordinarily desirable to form a concentrated liquid formulation, usually an emulsifiable concentrate or concentrated emulsion, of the chlorinated benzyl alcohol which will not show precipitation above about 20°F. and, more preferably, above about 10°F. A broad range of concentration for the chlorinated benzyl alcohol in a liquid formulation is from 0.05 percent to 90 percent by weight.

Table 1

Injury Ratings of Test Plants After Treatment With
1-Chloromethyl-2',4',6'-triisopropylbenzyl Alcohol
at 10 Pounds Per Acre

| Test Plants | Holding Period, Days after Application | |
|---|---|---|
| | 20 | 27 |
| Yellow Nutsedge (Cyperus esculentus, L.) (from tubers) | 0 | 0 |
| Wild Oats (Avena fatua, L.) | 0 | 2 |
| Jimsonweed (Datura stramonium, L.) | 5 | 5 |
| Velvetleaf (Abutilon theophrasti, Medic.) | 0 | 0 |
| Johnsongrass (Sorghum halepense, Pers.) | 9 | 9 |
| Lambsquarter (Chenopodium album, L.) | 5 | 2 |
| Mustard (Brassica kaber, L. C. Wheeler, var. pinnatifida, L. C. Wheeler) | 8 | 9 |
| Yellow Foxtail (Setaria glauca [L] Beauv.) | 9 | 9 |
| Barnyardgrass (Echinochloa crusgalli, Beauv.) | 8 | 9 |
| Crabgrass (Digitaria sanguinalis [L.] Scop.) | 10 | 10 |
| Buckwheat (Polygonum convolvulus, L.) | 0 | 0 |
| Morning Glory (mixture of Ipomoea purpurea, Roth and Ipomoea hederacea, Jacq.) | 0 | 0 |

Liquid concentrates generally contain from about 10 percent to about 70 percent by weight of the chlorinated benzyl alcohol. From about 35 percent to about 55 percent is preferred. Liquid formulations generally contain from about 0.05 percent to about 70 percent of the chlorinated benzyl alcohol at the time of application. Typically, the range is from 0.1 to 10. From about 0.5 percent to 5 percent is preferred.

Granular formulations may be prepared by spraying the molten chlorinated benzyl alcohol directly onto an inert carrier. In another method, a liquid formulation, either a solution or an emulsion, may be applied to the inert carrier particles. Many types of inert carrier particles are suitable for use in the instant invention. Among these are montmorillonite, bentonite, vermiculite, corn cobs, and sawdust. The chlorinated benzyl alcohol ordinarily constitutes from about 0.5 to about 50 percent by weight of these granular products. Typically, the chlorinated benzyl alcohol content ranges from about 1 to about 35 percent by weight. From about 10 to about 30 percent is preferred.

EXAMPLE III

Test compound is formulated in a solvent mixture (90% acetone, 8% methanol, and 2% dimethylformamide by volume) to form a solution. Appropriate weed species are seeded in individual, disposable, three-inch square containers containing about 2 inches of soil. A small amount of sand, usually one-eighth to one-fourth in depth, is applied to cover the seeds. The containers are placed on carrying trays and the carrying trays of containers are then placed on a conveyor belt having a linear speed of 1.3 miles per hour. As each tray is moved along on the conveyor belt, it trips a microswitch which, in turn, activates a solenoid valve and releases the solution of the test as sprays at the rate of 50 gallons per acre. The test compounds are immediately watered in and the containers then removed to the greenhouse and held for observation. Treatments are observed daily for interim response, final observations being made at the conclusion of the holding period. Any treatments including especially significant responses are held beyond the regular holding period until such response can be confirmed. Each result is reported as an Injury Rating which is represented as follows: 0 — no visible effect; 1, 2, 3 — slight injury, plant usually recovered with little or no reduction in top growth; 4, 5, or 6 — moderate injury, plants usually recovered but with reduced top growth; 7, 8, or 9 — severe injury, plants usually did not recover; 10 — complete control.

Using this procedure, 1-chloromethyl-2',4',6'-triisopropylbenzyl alcohol was evaluated. The identities of the test plants, holding periods, rate of application, and results are shown in Table 1.

What is claimed is:

1. The compound 1-chloromethyl 2',4',6'-triisopropylbenzyl alcohol.

* * * * *